United States Patent [19]

Shiraishi et al.

[11] Patent Number: 5,734,969

[45] Date of Patent: Mar. 31, 1998

[54] RADIO COMMUNICATION METHOD AND APPARATUS WHICH ADDS AN INTERRUPT ENABLE SYNCHRONIZING SIGNAL TO A COMPRESSED VOICE SIGNAL IN PLACE OF A SYNCHRONIZING A SIGNAL

[75] Inventors: Mitsuo Shiraishi, Musashino; Sakari Ohira, Sendai, both of Japan

[73] Assignees: Hitachi Denshi Kabushiki Kaisha, Tokyo; Tohoku Electric Power Co., Inc., Sendai, both of Japan

[21] Appl. No.: 657,080

[22] Filed: Jun. 3, 1996

[30] Foreign Application Priority Data

Jun. 8, 1995 [JP] Japan ................... 7-141921

[51] Int. Cl.⁶ ..................... H04B 1/00; H04B 1/44
[52] U.S. Cl. ............. 455/72; 455/58.1; 455/78; 455/54.1; 370/294
[58] Field of Search ............ 370/277–280, 370/294, 282, 296, 504, 503, 522–4, 528; 455/54.1, 51.1, 54.2, 72, 58.1, 78, 79; 379/208, 58, 63

[56] References Cited

U.S. PATENT DOCUMENTS

| | | | |
|---|---|---|---|
| 4,949,335 | 8/1990 | Moore | 370/29 |
| 5,091,906 | 2/1992 | Reed et al. | 370/94.1 |
| 5,170,490 | 12/1992 | Cannon et al. | 455/72 |
| 5,319,635 | 6/1994 | Reed et al. | 370/31 |
| 5,379,279 | 1/1995 | Bavkof et al. | 370/24 |
| 5,463,617 | 10/1995 | Grube et al. | 370/29 |
| 5,481,543 | 1/1996 | Veltman | 370/94.1 |
| 5,493,698 | 2/1996 | Suzuki et al. | 455/72 |
| 5,559,999 | 9/1996 | Maturi et al. | 395/550 |
| 5,594,779 | 1/1997 | Goodman | 379/59 |

*Primary Examiner*—Tommy P. Chin
*Assistant Examiner*—David Vincent
*Attorney, Agent, or Firm*—Antonelli, Terry, Stout, & Kraus, LLP

[57] ABSTRACT

A time-divisional duplex radio communication apparatus includes the steps of adding an interrupt enable signal to the compressed voice signal in place of the time-divisional synchronizing signal at a predetermined period in a radio communication apparatus served as a calling station, functioning the period corresponding to the time-divisional synchronizing signal as a reception period without having to add the time-divisional synchronizing signal to the compressed voice signal at the next transmission period if the interrupt enable signal from the calling station is received in a radio communication apparatus served as the called station, generating the interrupt request signal a predetermined time later than the reception of the interrupt enable signal of the calling station and transmitting the interrupt request signal in the reception periods of the calling station and the called station in a radio communication apparatus served as an interrupting station, indicating occurrence of an interrupt in response to the reception of the interrupt request signal in the radio communication apparatuses served as the calling station and the called station.

10 Claims, 6 Drawing Sheets

FIG. 2(a) CALLING STATION A
FIG. 2(b) CALLED STATION B
FIG. 2(c) MONITORING/INTERRUPTING STATION C

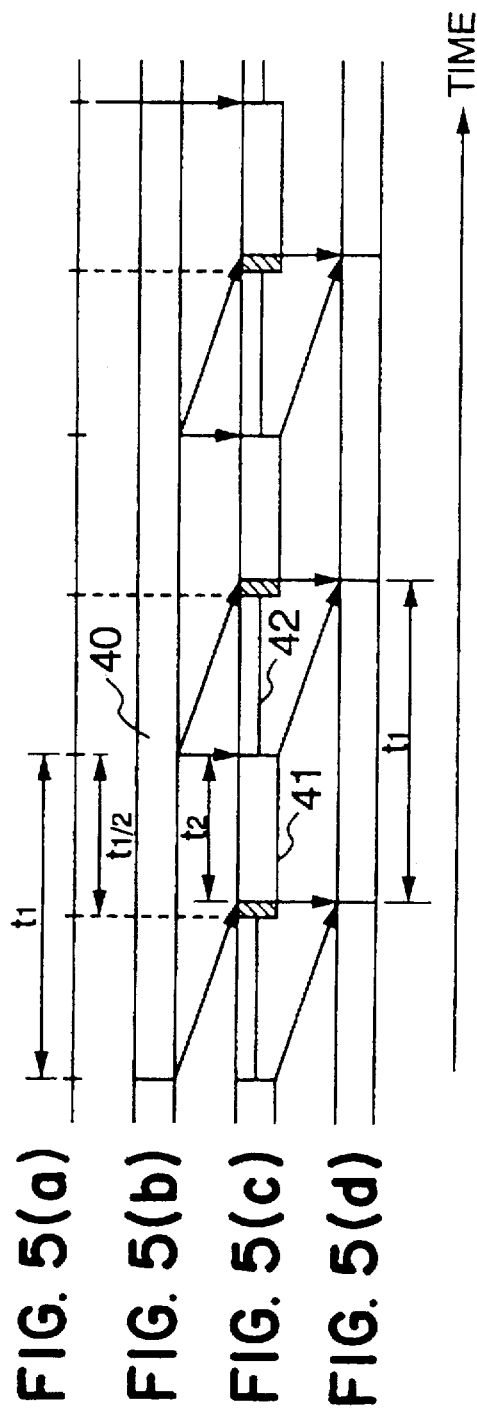

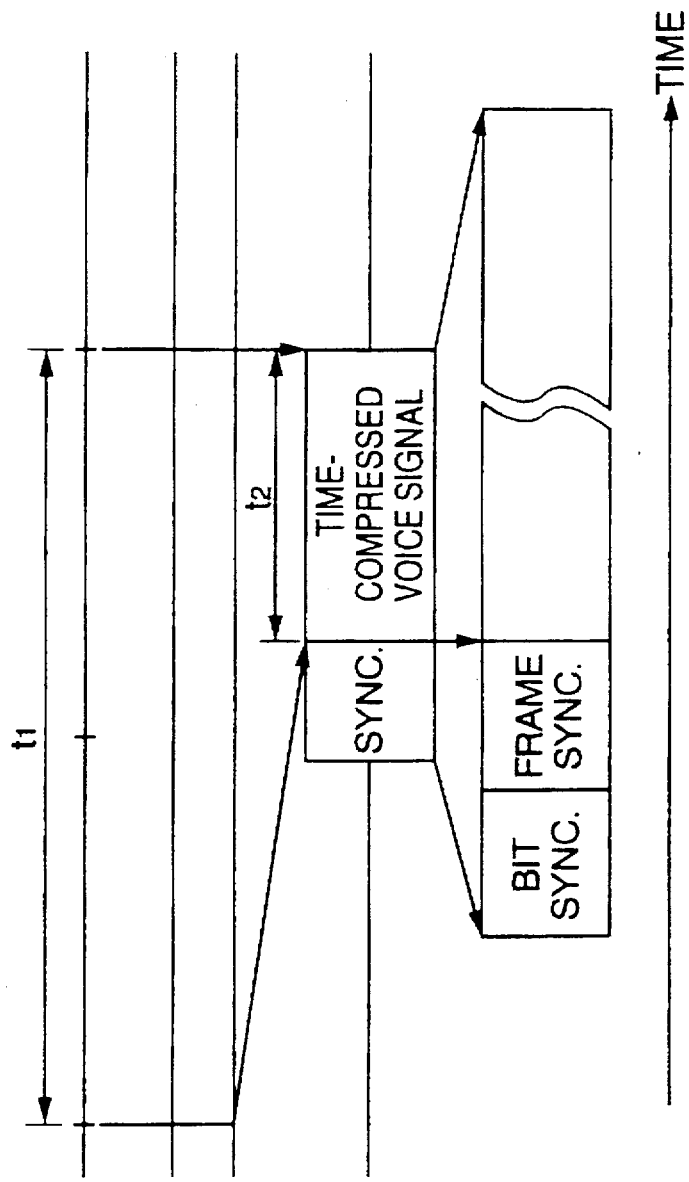

RADIO COMMUNICATION METHOD AND APPARATUS WHICH ADDS AN INTERRUPT ENABLE SYNCHRONIZING SIGNAL TO A COMPRESSED VOICE SIGNAL IN PLACE OF A SYNCHRONIZING A SIGNAL

BACKGROUND OF THE INVENTION

Two radio communication operations have been proposed for doing communication between transceivers remotely located from each other, concretely, a simplex operation and a duplex operation. The simplex operation is a so-called press-to-talk operation, which is executed to do communication between the transceivers through a channel of an allocated single frequency. The simplex operation is an alternate call and inhibits to do a simultaneous talk between the transceivers. The duplex operation enables to do a simultaneous call between the transceivers through two channels of the corresponding frequencies.

The present invention relates to a radio communication system that enables to do a substantially simultaneous call between the transceivers though it uses a single frequency channel like the simplex operation. More particularly, the invention relates to a time-divisional duplex radio communication apparatus and method that enable to do a substantially simultaneous call, that is, a substantial duplex call between simplex transceivers by compressing a voice signal in time axis and dividing the bidirectional voice signals in time axis.

A calling system between time-divisional duplex transceivers is called a single frequency simultaneous transmission/reception system. In this system, when a transceiver starts to talk with the other one, the transceiver serves as a calling station. The calling station sends a time-divisional synchronizing signal (called a synchronizing A signal) and then a voice signal compressed in time.

In response to the synchronizing A signal, the other simplex transceiver (called a simplex station) operates to switch the current simplex operation to the next duplex one. While the transceiver stays in the duplex operation but does not still start to send a signal, the transceiver is called a monitoring station. This monitoring station is a destination of the calling station. When the monitoring station starts to send a signal, the station is called a called station.

This called station operates to send another time-divisional synchronizing signal (called a synchronizing B signal) and then a voice signal compressed in time to the calling station. The synchronizing B signal is produced by changing a pattern of a frame synchronizing signal contained in the synchronizing B signal.

The principle of a duplex operation used in the time-divisional duplex transceiver will be described in more detail with reference to FIG. 4. As shown in FIG. 4, there are provided transceivers A and B. The transceiver A includes a time compressing circuit A1, a transmitting circuit A2, a switch A3, a receiving circuit A4, and a time expanding circuit A5. Likewise, the transceiver B includes a time compressing circuit B1, a transmitting circuit B2, a switch B3, a receiving circuit B4, and a time expanding circuit B5. Of the time axes shown in FIG. 5, a time-serial signal such as a voice signal is sectioned at each period (time-divisional period) $t_1$ by the time compressing circuits A1 and B1. The voice signal at each period $t_1$ is time-compressed into a period $t_2$ which is shorter than $t_1/2$. The compressed signal is made to be a burst signal 41 as shown in (c) of FIG. 5.

This burst signal 41 is sent from one transceiver to the other one at each period $t_1$ through the effect of the sending circuits A2 and B2 and the switches A3 and B3. The remaining period 42 ($t_2 < t_1/2$) of the sending period produced within the period $t_1$ is made to be a reception period of a signal from the other station.

At each time-divided period $t_1$, the substantial bidirectional simultaneous transmission/reception, that is, a pseudo duplex operation is enabled through a carrier signal of a single frequency $f_1$.

In this system, when the burst signal 41 is transmitted, as shown in FIG. 6, a frame is composed so that the voice signal time-compressed into the period $t_2$ contains a time-divisional synchronizing signal (synchronizing A signal or synchronizing B signal) composed of a bit synchronization and a frame synchronization at the head of the voice signal. The frame composition is executed through the effect of an MSK (Minimum Shift Keying) modem.

As noted above, the synchronizing B signal is produced by changing a pattern of a frame synchronizing signal contained in the synchronizing A signal. These synchronizing A or B signal is usually composed of a bit synchronizing signal and a frame synchronizing signal and is a MSK-modified subcarrier.

The bit synchronization signal is a signal composed of several to tens repetitive 1's and 0's. It is used for taking a bit synchronization when demodulating the MSK signal. The frame synchronization signal is composed of random codes of a specific pattern of ten and some bits. It is used for taking a time-dividing timing or a time-expanding timing with the time-compressed voice signal.

When the transceiver is in the reception period, the transceiver operates to identify a synchronizing signal in the burst signal received by the receiving circuit A4 or B4 and then take out the time-compressed voice signal following the synchronizing signal. As shown in (d) of FIG. 5, the time expanding circuit A5 or B5 operates to expand the signal compressed to the period $t_2$ into the period $t_1$ for reproducing the time-serial original voice signal.

The role of the synchronizing signal will be described below. The role is roughly divided into the following two:

(1) Identifying a head of the time-compressed voice signal for smoothing a joint of the reproduced voice signal, and (2) Taking a necessary synchronization with the switching operation of transmission/reception between the transceivers opposed to each other.

Next, the description will be oriented to the actual time distribution of the time compression or expansion. In an example, assume that the period $t_1$ is about 375 ms and a compressing ratio $t_2/t_1$ is 1/2.2. A gap time is caused since the compressing factor is assumed to be over ½. The synchronizing signal, a rise time required for actuating the sending circuit, and a switching time for switching "transmission" to "reception" through the switch are allocated to the gap time. A half of the period $t_1$, concretely, 187.5 ms is distributed as a transmission period, while another half is distributed as a reception period.

Hence, the system having such a time-divisional duplex transceiver is configured so that a calling station or a called station make each half of a time-divisional period and operates no send and receive the time-divisional synchronizing signal and the voice signal on the corresponding half of the period. As is obvious from FIG. 6, therefore, if the time-divisional synchronizing signal is made longer, the time allocated to the voice signal is reduced accordingly. If the voice signal takes a high time compressing factor for sending the voice signal at a short period, the speech quality is made lower.

3

As shown in FIG. 3, while the transceiver A is communicating with the transceiver B, another transceiver C may need no communicate with the transceiver A or B. In this case, the transceiver C has to give an interruption to a communication channel between the transceivers A and B. The interrupt speech service is executed in the public subscribing telephone service of Japan, which is called "Catch Phone". In this service, if a third subscriber C phones to the subscriber A when the subscriber A is communicating with a subscriber B, an interrupt tone reaches a handset of the subscriber A. When the subscriber A hears the interrupt tone, the subscriber A switches the speech with the subscriber B into the speech with the subscriber C.

For radio communication, a transceiver having a stronger field intensity of a transmitted radio wave is more dominant among the transceivers communicated or to be communicated with each other. Hence, the interrupt speech is enabled by increasing the field intensity (transmission power). In the case of FIG. 3, if a transceiver C (called an interrupt station) wants to interrupt the speech, the transceiver C has to send a radio wave having a stronger field intensity, that is, a larger transmission power than the calling station A (or the called station B) on a transmission timing of the calling station A (or the called station B).

However, the increase of the transmission power is limited. Further, the increase of the transmission power does not always guarantee provision of a stronger field intensity than those of the stations in communication with each other. Moreover, the increase of the transmission power disturbs both of the stations in communication with each other. Hence, it is disadvantageous in that the increase of the transmission power does not positively guarantee the interrupt speed.

A time-divisional duplex type transceiver is disclosed in U.S. Pat. No. 5,493,698, Suzuki et al., issued on Feb. 20, 1996.

SUMMARY OF THE INVENTION

In order to enable an interrupt speech in the time-divisional duplex, the inventors of the present application made the following studies.

In the time-divisional duplex type radio communication, a reception period dedicated to an interrupt signal may be located anywhere inside of each divided period $t_1$. However, if the reception period dedicated to the interrupt signal is prepared, it is necessary to reduce the period $t_2$ of the compressed voice signal 41 by the reception period. This hence increases the compressing ratio as described above. The increase of the compressing ratio is not preferable, because it brings about the degrade of the quality of the sound.

To avoid the degrade of the sound quality, the interrupt signal may be allocated not to the transmission period for the compressed voice signal but the period for the synchronizing signal. To prevent the sound quality from degrading, the prior art of the time-divisional duplex system takes precedence of the sound quality and thus operates to reduce a pattern of a frame synchronizing signal of a time-divisional synchronizing signal that has needed 31 bits from a view of preventing erroneous operation caused by noise to a smaller value, for example, 16 bits.

The experiment of the inventors or the like has proved that if the frame synchronizing signal consists of 16 bits, the erroneous operation caused by noise takes place once per about 60 seconds. As a result, though no calling station is provided, the noise causes the simplex station to be switched to the monitoring station.

4

To prevent such an unfavorable condition, when two time-divisional synchronizing signals are received in succession, for example, the simplex station is caused to be switched to the monitoring station. Further, when the state where no time-divisional synchronizing signal is received continues for over a predetermined duplex keeping time, the monitoring station is devised to be returned to the simplex station. This can suppress an occurrence ratio of an error operation once per about 45 days.

It is preferable to secure a reception period for an interrupt signal with any other method rather than reduction of the transmission period for the voice signal or reduction of bits of the time-directional synchronizing signal. The reduction of the transmission period brings about the degrade of the voice signal. The reduction of the bits brings about the erroneous operations.

It is an object of the present invention to provide a radio communication apparatus using a single frequency and method that enable to positively execute an interrupt call any time without lowering the quality of the speech and bringing about the speech disturbance.

According to an aspect of the invention, a time-divisional duplex radio communication apparatus operates to divide a serial voice signal at each predetermined period, compress the voice signal of the predetermined period in time, add a time-divisional synchronizing signal to the compressed voice signal and generate a transmission signal, transmit the transmission signal within a transmitting period contained in the predetermined period, receive a transmission signal containing the compressed voice signal from another station during the reception period contained in the predetermined period, and expand in time the compressed voice signal received within the reception period based on the time-divisional synchronizing signal for reproducing the original voice signal. In the operation, the radio duplex communication apparatus enables to do a substantial simultaneous communication with another station through a carrier of a simple frequency.

According to another aspect of the invention, a time-divisional duplex radio communication apparatus includes a unit for adding an interrupt enable signal to a compressed voice signal in place of the time-divisional synchronizing signal at predetermined regular periods, a unit for receiving an interrupt enable signal contained in the transmission signal from another station and prohibiting addition of the time-divisional synchronizing signal to the compressed voice signal at the next transmission period, a unit for receiving the interrupt enable signal contained in the transmission signal from another station, after passage of a predetermined time, bringing about an interrupt request signal and sending it, and a unit for indicating occurrence of an interrupt in response to the interrupt request signal from another station.

According to another aspect of the invention, a time-divisional duplex radio communication method takes the steps of dividing a serial voice signal into predetermined intervals, compressing in time a voice signal of the predetermined period, adding a time-divisional synchronizing signal to the compressed voice signal for generating a transmission signal, transmitting the transmission signal at a transmission period contained in the predetermined period, receiving the transmission signal contained in the compressed voice signal from another station at the reception period contained in the predetermined period, and expanding in time the compressed voice signal received within the reception period based on the time-divisional synchronizing signal for reproducing the original signal. This method makes it possible to do a substantial simultaneous communication between two radio communication apparatuses through a carrier of a simple frequency.

According to another aspect of the invention, a time-divisional duplex radio communication method includes the steps of: adding an interrupt enable signal to the compressed voice signal in place of a time-divisional synchronizing signal at a predetermined period in a calling radio communication apparatus; functioning the period corresponding to the time-divisional synchronizing signal as the reception period without adding the time-divisional synchronizing signal to the compressed voice signal at the next sending period if the interrupt enable signal is received from the calling apparatus in a called radio communication apparatus; receiving an interrupt enable signal of the calling apparatus, after passage of a predetermined time, bringing about an interrupt request signal and transmitting the signal within each reception period of the calling and the called apparatuses, and indicating an interrupt occurrence in response to the reception of the interrupt request signal in the calling and the called apparatuses.

Further objects and effects of the present invention will be apparent from the following description of the embodiments expanded with reference to the appended drawings.

BRIEF DESCRIPTION OF THE DRAWINGS

FIG. 5 is a timing chart for describing a principle of calling executed in the time-divisional duplex radio communication apparatus; and FIG. 6 is a timing chart for describing a time-divisional signal produced by the time-divisional duplex ratio communication apparatus.

DESCRIPTION OF THE PREFERRED EMBODIMENTS

Later, a time-divisional duplex communication apparatus according to the present invention will be described along the illustrative embodiments in more detail with reference to the drawings.

Figure 1:
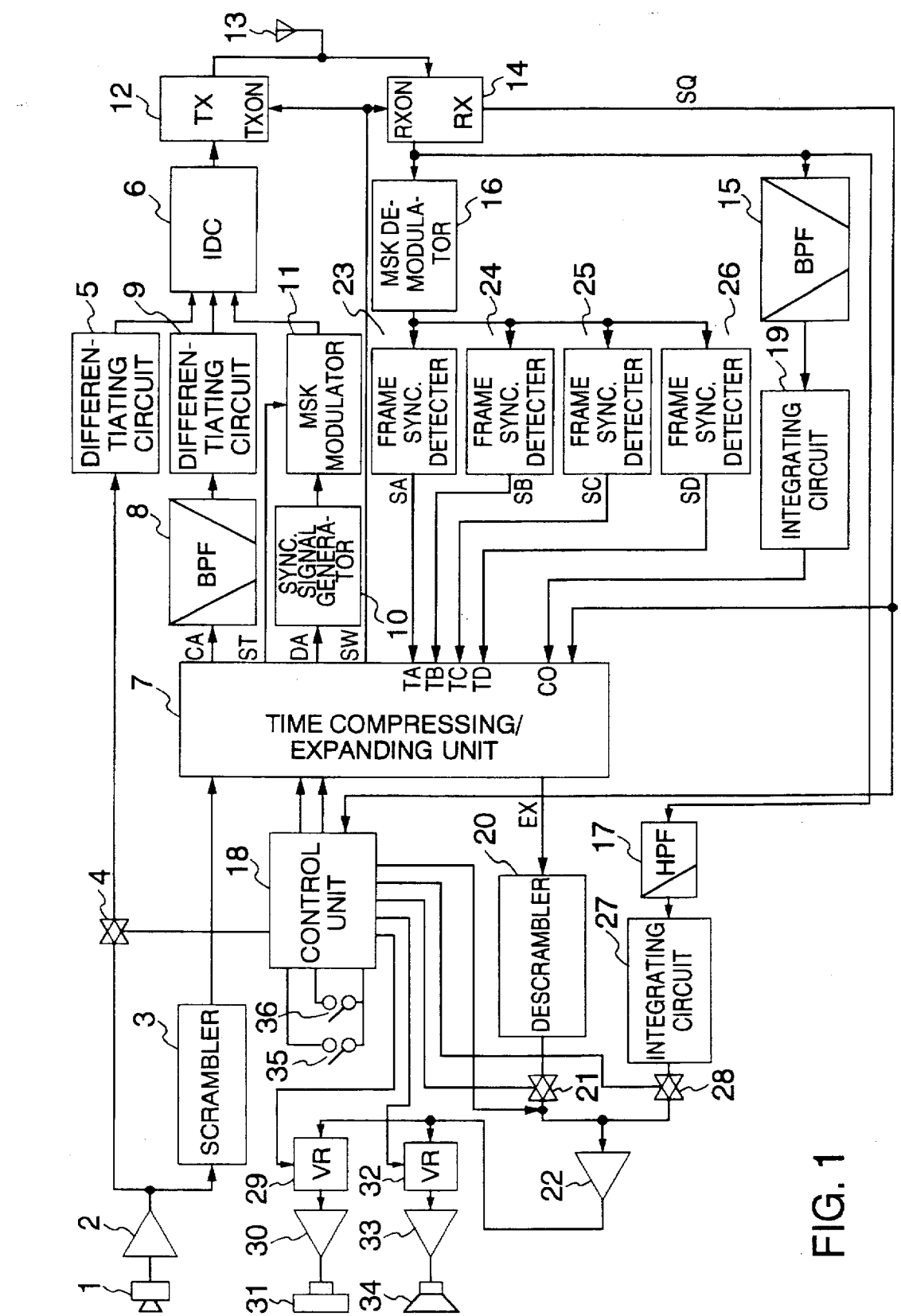
FIG. 1 is a block diagram showing a time-divisional duplex radio communication apparatus according to an embodiment of the present invention.
Figure 3:
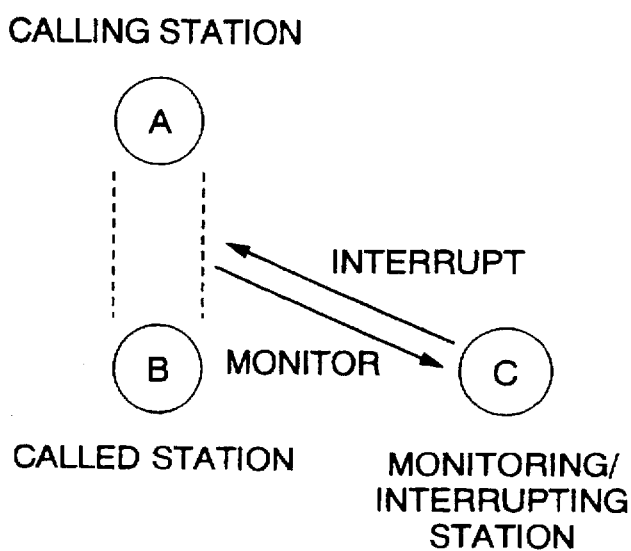
FIG. 3 is an explanatory view showing an interrupt calling operation to which the invention is applied.
Figure 4:
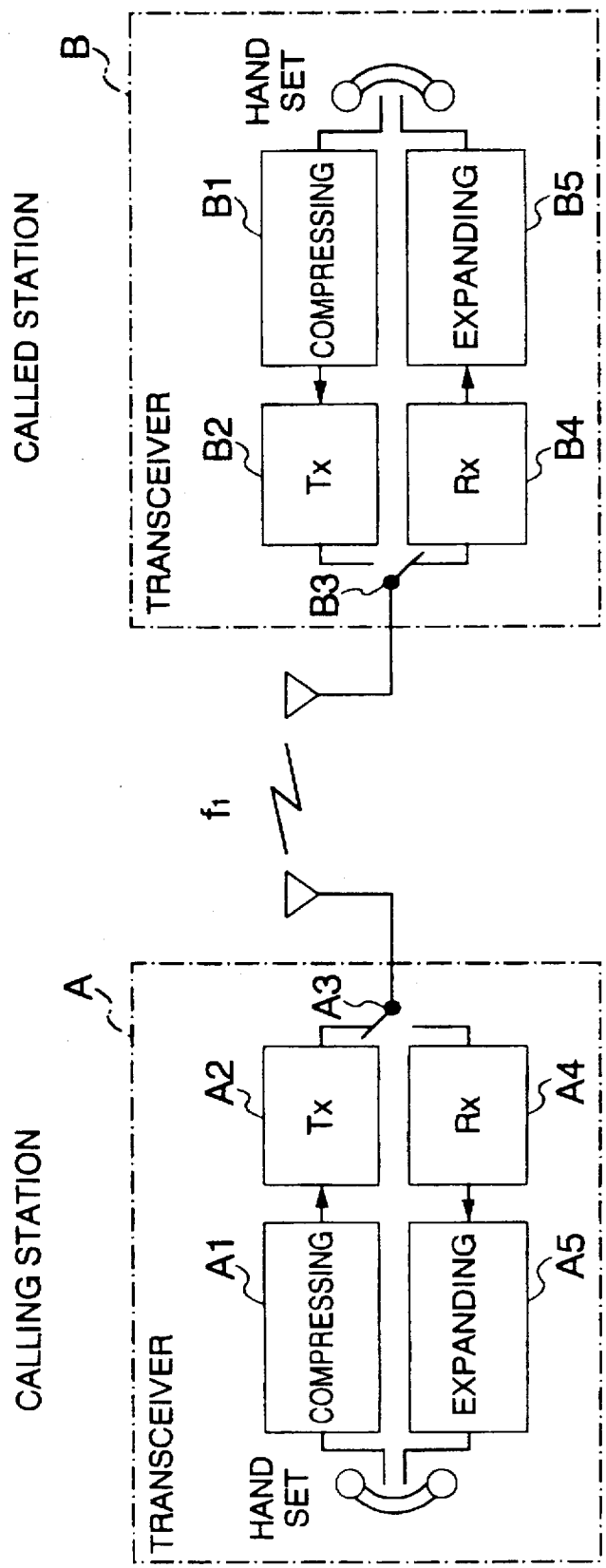
FIG. 4 is an explanatory view showing a principle of calling executed in the time-divisional duplex radio communication apparatus.

FIG. 1 is a block diagram showing a radio communication apparatus according to an embodiment of the present invention. In FIG. 3, a calling station A, a called station B and an interrupting station C each have the same arrangement as shown in FIG. 1. A numeral 1 denotes a microphone, the output of which is connected to an amplifier 2. The output of the amplifier 2 is connected to a scrambler 3 and an analog switch 4.

Then, the output of the scrambler 3 is applied into a time compressing/expanding unit 7. The time compressing/expanding unit 7 has an output terminal CA that is connected to an IDC (Instantaneous Deviation Control) circuit 6 through a bandpass filter 8 and a differentiating circuit 9. The output of the analog switch 4 is connected to the IDC circuit 6 through the differentiating circuit 5.

The time compressing/expanding unit 7 has a data output terminal DA that is connected to a parallel input terminal of a synchronizing signal generator 10. The time compressing/expanding unit 7 also has an output terminal ST for a synchronizing transmission start signal, which is connected to an input terminal for a synchronizing transmission start signal provided in an MSK modulator 11.

The synchronizing signal generator 10 provides a serial output terminal that is connected to an input terminal of the MSK modulator 11. The output of the MSK modulator 11 is connected to the IDC circuit 6. Then, the output of the IDC circuit 6 is connected to an input terminal for an FM modulating signal provided in a radio frequency transmitting unit 12.

The radio frequency transmitting unit 12 transmits a radio frequency wave output to an antenna 13, which is also connected to an input terminal of a radio frequency receiving unit 14. The radio frequency receiving unit 14 outputs an FM demodulating output to a bandpass filter 15, an MSK demodulator 16 and a highpass filter 17. Further, the radio frequency receiving unit 14 outputs a squelch signal to an input terminal for a compressed squelch signal provided in the time compressing/expanding unit 7 and an input terminal for a squelch signal provided in a control unit 18.

The output of the bandpass filter 15 is applied to an input terminal C for a compressed signal provided in the time compressing/expanding unit 7 through an integrating circuit 19. The time compressing/expanding unit 7 also provides an expanded signal output terminal EX that is connected to an input terminal of a low frequency amplifier 22 through a descrambler 20 and an analog switch 21.

The output of the MSK demodulator 16 is connected to a first frame synchronizing detector 23 for sensing the synchronizing A signal SA, a second frame synchronizing detector 24 for sensing a synchronizing B signal SB, a third frame synchronizing detector 25 for sensing an interrupt enable synchronizing signal SC, and a fourth frame synchronizing detector 26 for sensing an interrupt request synchronizing signal SD. These frame synchronizing detectors 23 to 26 detect the synchronizing signals SA to SD and supply these signals to the synchronizing input terminals TA, TB, TC and TD provided in the time compressing/expanding unit 7, respectively.

Each of the first to the fourth detectors 23 to 26 is composed of a serial and parallel converting shift register and a comparator. The serial input terminal of the shift register is connected to the output terminal of the MSK demodulator 16. The comparator has an input terminal that is connected to an N-bit pattern input terminal and an N-bit parallel output terminal of the shift register. The output terminal of the comparator is served as an output terminal for a sensed frame synchronizing signal provided in each frame synchronizing detector.

A frame synchronizing pattern is set to the pattern input terminal. Each of the frame synchronizing detectors 23 to 26 has the basically same arrangement with each other except that each has the corresponding frame synchronizing pattern set thereto. When an N-bit signal (data) is applied to the input terminal of the comparator provided in each detector, if the N-bit signal coincides with the set frame synchronizing pattern, the comparator outputs a value of "1", while it does not coincide with the set pattern, the comparator outputs a value of "0".

The shift register is shifted in response to a clock signal reproduced by the MSK demodulator 16. This shifting operation enables the serial data codes corresponding to the demodulated output of the MSK demodulator 16 to be serially applied to the shift register.

The N-bit parallel output signal of this shift register is serially changed with time in response to the clock signal reproduced by the MSK demodulator 16. Only if the output of the shift register coincides with an N-bit pattern input applied to the comparator, the comparator outputs a value of "1". It means that the detector senses the corresponding synchronizing signal.

Figure 2:
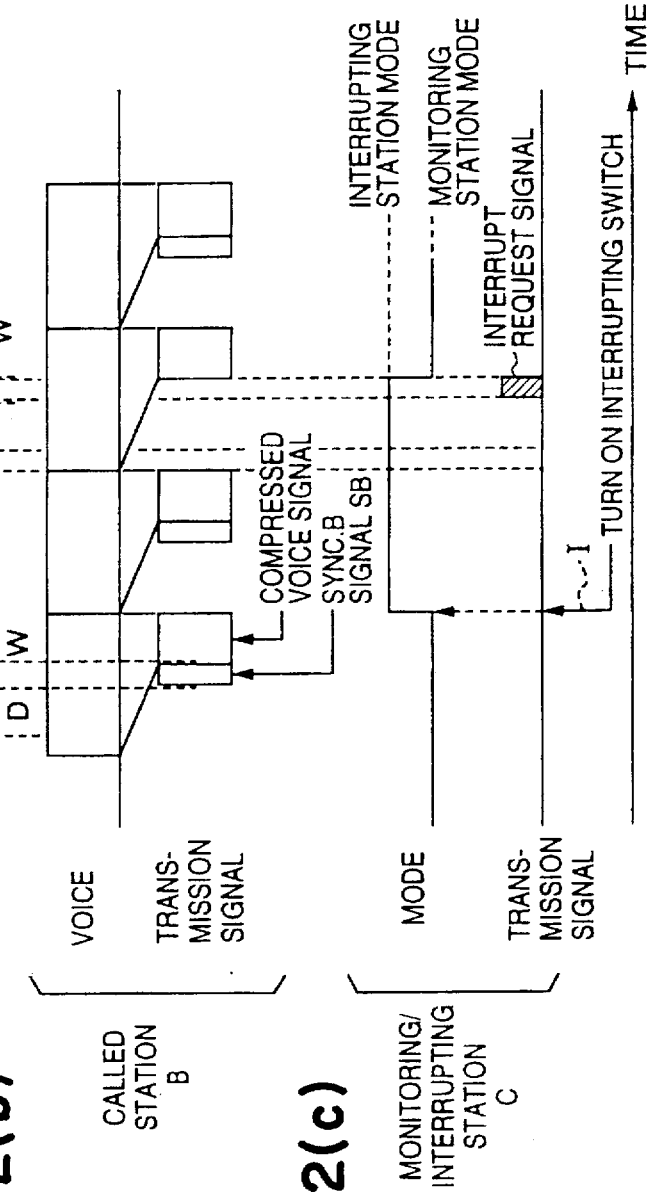
FIG. 2 is a timing chart for describing an operation of the apparatus according to the embodiment of the invention.

The interrupt enable synchronizing signal (called the interrupt enable signal) SC and the interrupt request synchronizing signal (called the interrupt request signal) are the feature of the present invention. The synchronizing A signal SA and the synchronizing B signal SB are the same synchronizing signal for time-divisional duplex as indicated in FIG. 2. The details of these signals will be described below.

The output of the highpass filter 17 is applied to the low-frequency amplifier 22 through an analog switch 28. The output of the low-frequency amplifier 22 is applied to a handset through an electronic volume 32 and a receiver amplifier 30. Concurrently, the output is applied to a speaker 34 through an electronic volume 32 and a speaker amplifier 33.

The time compressing/expanding unit 7 has a transmission/reception switching output terminal SW that is connected to transmission/reception switching input terminals TXON and RXON of the high frequency transmitting unit 12 and the high frequency receiving unit 14.

As noted above, a control unit 18 is connected to the time compressing/expanding unit 7. The control unit 18 operates to output various control signals such as a transmission/reception switching signal and a calling/called/simplex mode switching signal to the time compressing/expanding unit 7. The time compressing/expanding unit 7 operates to output a frame synchronizing sensing signal, an expanding squelch signal, and response signals to various control signals.

The control unit 18 is also connected to the outputs of a duplex switch 35 and a PTT (Press-to-Talk) switch 36. The control unit 18 has an alarm output terminal that is connected to the input terminal of the low frequency amplifier 22.

When the duplex switch 35 is depressed at first in the transceiver at the simplex mode, the mode is switched to the duplex mode. Once the transceiver enters into the duplex mode, a speech mode is switched to a monitor mode or vice versa each time the duplex switch 35 is depressed.

The transceiver according to this embodiment has the same hardware arrangement as the time-divisional duplex transceiver disclosed in U.S. Pat. No. 5,493,698 except the provision of the third frame synchronizing detector 25 for sensing the interrupt enable synchronizing signal SC and the fourth frame synchronizing detector 26 for sensing the interrupt request synchronizing signal SD and the contents of the control done by the control unit 18 and the time compressing/expanding unit 7. Hence, the detailed description about each component of the transceiver is not left off the specification.

Next, the description will be oriented to the operation of this embodiment.

At first, the simplex transceiver of this embodiment is operated as follows. This operation is the same as the invention disclosed in U.S. Pat. No. 5,493,698.

The FM-demodulated output of the high frequency receiving unit 14 is supplied to the low frequency amplifier 22 through the integrating circuit 27 and the analog switch 28 after a tone component contained in a Lone squelch is removed from the FM-demodulated output through the effect of the highpass filter 17. The output of the low frequency amplifier 22 is applied to the handset 31 through the electronic volume 29 and the receiver amplifier 30 as well as to the speaker 34 through the electronic volume 32 and the speaker amplifier 33.

The control unit 8 is arranged so that for outputting a voice, any one of the handset 31 and the speaker 34 may be selected by the predetermined operation if necessary. The squelch signal SQ output from the high frequency receiving unit 14 is delayed by the control unit 18 and is used for controlling the analog switch 28.

When the PTT switch 36 is depressed, the control unit 18 operates the time compressing/expanding unit 7 to be an the simplex transmitting mode until the PTT switch 36 is released. The output of the transmission/reception switching output terminal SW is switched to a transmission signal. Further, the high frequency transmitting unit 12 is switched from a stopping state to a transmitting state.

At this time, the time compressing/expanding unit 7 operates to stop the output of the voice signal and the control unit 18 keeps the analog switch 4 in the passing state. This operation allows the output of the amplifier 2 to be directly applied to the IDC circuit 6 and then sent by the high frequency sending unit 12.

At this time, hence, the transceiver is operated as an ordinary PTT system simplex station so that the sending operation is switched to the receiving operation or vice versa by handling the PTT switch 36.

In turn, the description will be oriented to how the transceiver served as a calling station operates.

In order to enter the transceiver into a calling mode, that is, an operating mode at which the transceiver is served as the calling station A, the duplex switch 35 is pressed in the prerequisite condition that no other calling station except the station A takes place.

For this purpose, it is requisite that the calling station A does not receive the synchronizing A signal and the interrupt enable signal from another station.

The process for sensing these synchronizing signals will be described below. These signals are allowed to be sensed by the time compressing/expanding unit.7 and monitored by the control unit 18. When the duplex switch 35 is depressed, unless these time-divisional synchronizing signals are received, the control unit 18 operates to put the time compressing/expanding unit 7 into the calling mode and switch it to the transmission at first.

That is, the time compressing/expanding unit 7 operates to switch the signal from the transmission/reception switch output terminal SW to a transmission signal, activate the high frequency transmitting unit 12, output the pattern of the synchronizing A signal SA containing the bit synchronizing signal to the data output terminal DA, store the pattern in a shift register provided in the synchronizing signal generator 10, and activate the MSK modulator 11 to output the synchronizing transmission start signal ST. In response to the signal ST, the synchronizing signal generator 10 operates to apply the MSK-modulated synchronizing A signal SA to the high frequency transmitting unit 12 through the IDC circuit 6 and then send the signal at the antenna 13 as shown in (a) of FIG. 2.

After sending of the synchronizing A signal is terminated, the time compressing/expanding unit 7 stops to output the signal. In place, the compressed voice signal is output at the compressed signal output terminal CA. The compressed signal is supplied to the high frequency transmitting unit 12 through the bandpass filter 8, the differentiating circuit 9, and the IDC circuit 6. The compressed voice signal is sent at the antenna 13 as shown in (a) of FIG. 2.

When transmission of the voice signal compressed into a half of the period $t_1$ of about 375 ms, that is, a length of 187.5 ms is terminated, the time compressing/expanding unit 7 operates to switch the signal at the transmission/reception switch output terminal SW into the receiving signal for stopping the operation of the high frequency transmitting unit 12. As a result, the transmission period is switched to the next reception period of 187.5 ms.

Then, after the next reception period of 187.5 ms following the transmission period is passed, unless the control unit 18 is switched from the transmitting mode to the receiving mode, the time compressing/expanding unit 7 operates to switch the signal at the transmission/reception switch output terminal SW into the transmission signal, activate the high frequency transmitting unit 12, and return the operation to the transmitting mode at which the patterns of the bit synchronizing signal and the synchronizing A signal SA are output to the data output terminal. Later, these sending and receiving operations are repeated at each of the period $t_1$ of about 375 ms.

In this embodiment, each time the times of transmitting the synchronizing A signal SA reaches the predetermined times, as shown in (a) of FIG. 2, the time compressing/expanding unit 7 and the control unit 18 are arranged so that the interrupt enable signal SC having a different pattern from the synchronizing A signal is output to the data output terminal DA in place of the synchronizing A signal.

The transmitting interval of the interrupt enable synchronizing signal SC may be optionally defined. For example, the transmitting interval may be selected among 0.75 second, 1.5 second, 3 seconds, 6 seconds, 12 seconds, 24 seconds and 48 seconds. In general, it is shown in $2t_1 \times 2^n$ (, where n is zero or positive integer.).

Consider it as a frequency of transmitting the interrupt enable synchronizing signal SC. As noted above, if the time-divisional period $t_r$ is 375 ms, concretely, the transmitting intervals of 0.75 second, 1.5 second, 3 seconds, 6 seconds, 12 seconds, 24 seconds and 48 seconds correspond to once for two periods, once for four periods, once for eight periods, once for 16 periods, once for 32 periods, and once for 64 periods, respectively.

In this embodiment, the time compressing/expanding unit 7 is arranged to ignore the synchronizing B signal from another station received from the second frame synchronizing detector 24 on any timing except the predetermined timing (called a timing window N) in the above-indicated reception period. This arrangement serves to fully suppress the erroneous operation caused by noise.

For example, a timing window is set between the rising timing of the synchronizing A signal as shown in FIG. 2 and a time W (within the reception period) passed by the predetermined time D from the rising timing. Only the synchronizing signal B received in the timing window is effective. The management of the timing window is made possible by counting the time with a timer circuit (not shown).

Herein, as noted above, the time compressing/expanding unit 7 starts to sample the compressed voice signal sent from the called station B and output by the integrating circuit 19. As will be described below, if the interrupt request signal SC is sent from the interrupt station C, no synchronizing signal B is sent from the called station B. If no synchronizing signal B is sent, the sampling of the voice signal sent from the called station B is started on the timing of the center (W/2) of the timing window W.

When receiving the compressed voice signal, the time compressing/expanding unit 7 operates to sample the compressed squelch signal supplied from the high frequency receiving unit 14 and expand the periods of the voice signal and the squelch signal.

The voice signal expanded by the time compressing/expanding unit 7 is supplied to the expanded signal output terminal EX and then is applied to the analog switch 21 through the descrambler 20.

The rise of the squelch signal is delayed from the rise of the carrier. Hence, the time compressing/expanding unit 7 operates to compensate for the rise delay by holding the squelch signal for the delaying time of the squelch signal resulting from the time expansion of the signal. Then, the squelch signal is output to the control unit 18.

The interrupt request synchronizing signal SD from the interrupt station C received by the fourth frame synchronizing detector 26 is set so that its receiving timing is managed by the timing window W like the synchronizing B signal. This setting also makes it possible to reduce the erroneous operation caused by noise.

When this interrupt request synchronizing signal SD is received by the time compressing/expanding unit 7 of the calling station A, the control unit 18 operates to feed to the low frequency amplifier 22 a predetermined voice signal AH in response to the signal SD so that at least one of the handset 31 and the speaker 34 can output an alarm for noticing an interrupt request. For the signal SD, the control unit 18 may be arranged to control the calling station A to stop the transmitting operation after a predetermined time and forcibly terminate the speech.

During the reception period R of the calling station A immediately after the calling station A transmits the interrupt enable synchronizing signal SC, the called station B does not transmit the synchronizing B signal as indicated in (b) of FIG. 2. A predetermined time later than when the calling station A receives the interrupt enable synchronizing signal SC, the interrupting station C operates to transmit the interrupt request signal SD. While the signal SC is being transmitted, it is obvious from FIG. 2 that the calling station A and the called station B are both in the reception mode. The called station B starts to transmit the compressed voice signal of its own a bit later than the termination of the reception of the signal SD. This timing is controlled by the control unit 18. This delay inhibits collision of the interrupt request signal SD against the compressed voice signal of the called station B.

When the called station B does not transmit the synchronizing B signal, the calling station A and the monitoring station C are not allowed to receive any carrier. And, the compensation for the rise delay of the compressed squelch signal keeps the squelch circuit open, so that noise is output from the speaker.

To prevent this noise, the time compressing/expanding unit 7 according to this embodiment is arranged as follows. During the reception period immediately after the calling station A transmits the interrupt enable synchronizing signal SC, the calling station A and the monitoring station C operate to transmit the signals as keeping the expanded squelch signal close (cutting off the voice) for a delaying time of the transmission start in precedence of the compressed squelch signal and the compensation for the rise delay of the compressed squelch signal.

Then, the control unit 18 operates to control the analog switch 21 on and off for doing the squelch operation in response to the expanded squelch signal fed from the time compressing/expanding unit 7.

As a result, in this embodiment, a voice is slightly interrupted during the speech. However, this interruption is negligible for the smooth speech and does not offset an advantage of a precise squelch function.

The received voice signal passed through the analog switch 21 and the amplifier 22 is fed to both the volumes 29 and 32. The control unit 18 enables the electronic volume 29 to hear the received voice signal through the handset 31. On the other hand, to prevent howling and echo, the control unit 18 enables the electronic volume 32 not to the received voice signal through the speaker 34, because the output voice level at the speaker 34 is much louder than the output voice level at the handset 31. However, this operation is not required if an echo canceller is provided.

In turn, the description will be oriented to a monitoring station mode at which the transceiver is served as a monitoring station. The monitoring station mode means the mode at which the transceiver does not perform the transmission but just receives the transmission from another transceiver.

The transceiver shown in FIG. 3 is allowed to enter into the monitoring station mode only if another transceiver is served as the calling or the called station. In order to prevent the erroneous operation based on the noise, the system according to this embodiment is arranged so that the transceiver is allowed to enter into the monitoring station mode only if a synchronizing signal is received plural times.

In the transceiver C, any one of the four frame synchronizing detectors 23 to 26 senses the time-divisional synchronizing signal from another transceiver, when the time expander 7 receives the signal as the timing on which the above-indicated timing window is made open.

If the time-divisional synchronizing signal is any one of the synchronizing A signal SA and the interrupt enable synchronizing signal SC, when the same synchronizing A signal SA or the same interrupt enable synchronizing signal SC is received from another station again in succession, the time compressing/expanding unit 7 operates to transmit the existence of the calling station A to the control unit 18, and the control unit 18 enables the time compressing/expanding unit 7 to be switched to a called and non-transmitting mode, that is, the monitoring station mode.

In case that the time-divisional synchronizing signal is any one of the synchronizing B signal SB and the interrupt request synchronizing signal SD from another station, like the above case, when the same signal is received again in succession, the time compressing/expanding unit 7 is enabled to be switched to the monitoring station mode.

Once the transceiver enters into the monitoring station mode, the control unit 18 is arranged so that the time compressing/expanding unit 7 may be switched back to the simplex mode while no time-divisional synchronizing signal is being received for a predetermined duplex holding time.

Hence, at this mode, the transceiver keeps the reception of the speech between another calling station and another called station, that is, stays at the monitoring station mode.

Next, the description will be oriented to how the transceiver served as the called station operates.

The sampling and the expansion of the compressed voice signal and the compressed squelch signal are performed by both of the calling station and the called station, the latter of which has been described above. This enables a pseudo duplex speed between the calling station and the called station.

When the duplex switch 35 is depressed in the transceiver served as the monitoring station, as shown in (b) of FIG. 2, the reception of the synchronizing A signal from the calling station A enables the control unit 18 to switch the mode of the time compressing/expanding unit 7 to the called mode.

The operation at the called mode, that is, the operation of the transceiver served as the called station B as shown in FIG. 3 is the basically same as the above-indicated operation of the transceiver served as the calling station A, that is, the operation at the calling mode. The operation at the calling mode is different from the operation at the called mode only in the following respect. That is, the time compressing/expanding unit 7 and the control unit 18 are controlled so that as is obvious from (b) of FIG. 2, the time-divisional synchronizing signal to be sent out on the first timing of the transmission period is the synchronizing B signal SB and when the interrupt enable synchronizing signal SC sent out of the calling station A is received, during the later transmission period, the transmission of the synchronizing B signal SB is stopped.

That is, when the interrupt enable synchronizing signal SC is received, the time compressing/expanding unit 7 does not generate the synchronizing B signal SB and starts to output the compressed voice signal slightly later than the reception timing of the interrupt request synchronizing signal SD in a manner that the voice signal does not conflict with the interrupt request synchronizing signal SD to be transmitted from the interrupting station.

According to this embodiment, therefore, if a transceiver is switched to the calling station A and another transceiver is switched to the called station B accordingly, the same duplex speech as the ordinary phone speech is made possible.

According to this embodiment, as shown in (a) of FIG. 2, the interrupt enable synchronizing signal SC is transmitted from the calling station A at a predetermined frequency. Afterwards, in response to the reception of the interrupt enable signal SC, as shown in (b) of FIG. 2, the operation is executed to stop the transmission of the first synchronizing B signal SB in the transmission period of the called station B. On the timing when the synchronizing B signal disappears, the calling station A and the called station B may receive the interrupt from another transceiver.

Next, the description will be oriented to how the transceiver served as the interrupting station C of FIG. 3 operates.

As shown in FIG. 3, the monitoring station C can grasp the existence of the calling station A and the called station B from the reception of the synchronizing signal A or B. When a user depresses the duplex switch 35 common to an interrupting switch of the monitoring station C at the timing I, while the calling station A and the called station B are on the channel, as shown in (c) of FIG. 2, the control unit 18 is transferred from the monitoring station mode to the interrupting station mode at the same timing. The control unit 18 operates to temporarily store in memory the current state, that is, the interrupting station mode at which the control unit 18 itself is.

In the interrupting station mode, when the interrupt enable synchronizing signal SC from the calling station A is sensed by a third frame synchronizing detector 25, the signal SC is applied to the control unit 18 of the interrupting station C through the time compressing/expanding unit 7. Then, the control unit 18 requests the time compressing/expanding unit 7 to transmit the interrupt request synchronizing signal SD.

In response to the request for transmitting the signal SD, the time compressing/expanding unit 7 operates to activate the high frequency transmitting unit 12 on the same timing as the transmission of the synchronizing B signal SB and output the pattern of the interrupt request synchronizing signal SD containing the bit synchronizing signal to the data output terminal DA during a gap appearing when the called station B stops the transmission of the synchronizing B signal SB and delays the transmission of the next compressed voice signal. The interrupt request signal SD is saved in the shift register contained in the synchronizing signal generator 10. At a Lime, the time compressing/expanding unit 7 operates to supply the synchronizing transmission start signal ST to the MSK modulator 11.

As a result, the synchronizing signal generator 10 operates to output the MSK-modulated interrupt request synchronizing signal SD to the high frequency transmitting unit 12 through the IDC circuit 6. On the same timing when the synchronizing B signal SB is transmitted from the calling station B, the interrupt request synchronizing signal SD is transmitted from the antenna 13.

Next, on the termination of sending the signal, the time compressing/expanding unit 7 operates to stop the output of the signal SD and start the reception of the signal from the transmission/reception switching output terminal SW for stopping the high frequency transmitting unit 12.

In the calling station A and the called station B that are communicated in a duplex mode, when the interrupt request synchronizing signal SD is received, an alarm for noticing the reception of the interrupt request is output from at least one of the handset 31 and the speaker 34. As a result, the calling station A and the called station B can positively grasp the issuance of the interrupt request from another transceiver and may shift to the interrupt speech with the interrupting station C if necessary.

According to this embodiment, therefore, the transmission timing where the synchronizing B signal SB of the called station B is to be transmitted is prepared as the interrupt request reception period. Hence, without having to enhance the strength of the transmission electric field of the interrupting station C, the calling station A enables to easily sense the interrupt request synchronizing signal SD sent from this interrupting station C and positively know the issuance of the interrupt request.

Next, the description will be oriented to how the calling station A and the called station B are operated when they are shifted to the interrupt speech.

In the calling station A and the called station B interrupted by another transceiver, the users knows the interrupt through an alarm. The users finish the current speech as fast as possible and stop the transmission of the called station B or both the calling station A and the called station B so that the interrupting station C may transmit the voice signal.

If only the called station B stops the transmission, the interrupting station C is operated as the called station so that it can communicate with the calling station A. If both the calling station A and the called station B stop the transmission, the interrupting station C is operated as the calling station so that it can communicate with any one of the stations A and B.

When the interrupt enable synchronizing signal and the interrupt request synchronizing signal are sent out, it is impossible to obtain the original time-divisional synchronizing signal required for expanding the compressed voice signal. If the frequency of disabling to obtain the original time-divisional synchronizing signal is suppressed to a certain level or less, the compressed voice signal is allowed to be expanded on the timing generated from the previously received time-divisional synchronizing signal. Hence, the aim is achieved without any problem.

According to another embodiment of the invention, the user does not necessarily enable the calling station or the called station interrupted by another transceiver to stop the transmission. The control unit 18 may be arranged to start a predetermined timer in response to the reception of the notice for interrupt so that the transmission is automatically stopped a predetermined time later.

In turn, the description will be oriented to how the interrupting station C is operated.

As mentioned above, after transmitting the interrupt signal, the interrupting station is automatically switched back to the monitoring station. If the user depresses the duplex switch 35 when the interrupting station C is at the monitoring station mode, the interrupting station C is made to be the calling station or the called station.

According to another embodiment of the invention, the control unit 18 may control the interrupting station so that it senses the stop of the transmission from another station after it transmits the interrupt signal and is automatically switched to the calling station or the called station.

According to another embodiment of the invention, the control unit 18 may control the interrupting station so that when the transmission from another station is not stopped and the duplex switch 35 is depressed after the interrupting station transmits the interrupt signal, the interrupting station is switched back to the monitoring station, while when the transmission from another station is stopped, the interrupting station is switched to the called station and then automatically starts the transmission for doing an immediate contact with the calling station.

If both of the calling station and the called station stop their transmissions, the control unit 18 may control the interrupting station so that the interrupting station is switched to the calling station and then automatically starts the transmission for doing an immediate contact with any of these stations.

According to the invention, the occurrence of the interrupt is allowed to be constantly and positively indicated without having to increase the transmission power. Hence, the invention offers an inexpensive time-divisional duplex communication apparatus that constantly and positively guarantees the start of the interrupt speech against the request for the interrupt speech without any speech disturbance.

What is claimed is:

1. A radio communication apparatus for doing a substantially simultaneous communication with another station using a carrier of a single frequency, wherein a transmission period and a reception period in said apparatus are alternately set in operation, arranged to divide a voice signal into a plurality of signals with predetermined intervals, compress the divided voice signal with a predetermined rate in time axis, add a synchronizing signal to the compressed voice signal for generating a transmission signal, transmit said transmission signal within said transmission period, receive a transmission signal containing a compressed voice signal from another station within said reception period, and expand said compressed voice signal from said another station based on said synchronizing signal in time axis for reproducing an original signal, said apparatus comprising:

means for adding an interrupt enable signal to said compressed voice signal of said transmission signal in place of adding a synchronizing signal at a predetermined period;

means for receiving an interrupt enable signal contained in said transmission signal from another station;

means for generating an interrupt request signal; and control means for controlling so as to prohibit that said synchronizing signal is added to said compressed voice signal in the next transmission period when said interrupt enable signal is received to said received means, and for controlling so as to transmit said interrupt request signal at a predetermined time later than the reception of said interrupt enable signal.

2. A radio communication apparatus as claimed in claim 1, further comprising means for indicating occurence of an interrupt in response to the reception of said interrupt request signal.

3. A radio communication apparatus as claimed in claim 1 further comprising means for automatically stopping the transmission at a predetermined time later than the reception of said interrupt request signal from another station.

4. A radio communication apparatus as claimed in claim 1 further comprising means for effectuating only a synchronizing signal received from another station within a predetermined time window located a predetermined time later than the timing of said synchronizing signal generated by its own apparatus, and wherein said compressed voice signal from another station is expanded in time axis for reproducing an original voice signal on said effective synchronizing signal.

5. A radio communication apparatus as claimed in claim 4, wherein when said interrupt request signal is received, the compressed voice signal from another station is expanded in time axis in response to the timing of the center of said predetermined time window for reproducing an original signal.

6. A radio apparatus as claimed in claim 1, wherein the transmitting interval of said interrupt enable signal is $2t_1 \times 2^n$ (wherein $t_1$: transmission period, n: 0 or positive integer).

7. A radio communication method for doing a substantially simultaneous communication between two radio communication apparatuses using a carrier of a single frequency, wherein a transmission period and a reception period in said apparatus are alternately set in operation, arranged to divide a voice signal into a plurality of signals with predetermined intervals, compress the divided voice signal with a predetermined rate in time axis, add a synchronizing signal to the compressed voice signal for generating a transmission signal, transmitting said transmission signal within said transmission period, receive a transmission signal containing a compressed voice signal from another station within said reception period, and expand in time axis said compressed voice signal from said another station based on said synchronizing signal for reproducing an original signal, said method comprising the steps of:

adding an interrupt enable signal to said compressed voice signal of said transmission signal in place of adding a synchronizing signal at a predetermined period in the radio communication apparatus served as a calling station;

functioning the period corresponding to said synchronizing signal as said reception period without adding said synchronizing signal to said compressed voice signal in the next transmission period when said interrupt enable signal from said calling station is received in the radio communication apparatus served as a called station;

generating an interrupt request signal at a predetermined time later than the reception of said interrupt enable signal from said calling station and transmitting said interrupt request signal in the reception periods of said calling station and said called station in a radio communication apparatus served as an interrupting station; and indicating occurrence of an interrupt in response to the reception of said interrupt request signal in said radio communication apparatuses.

8. A radio communication method as claimed in claim 7 further comprising the step of stopping the transmission at a predetermined time later than the reception of said interrupt request signal in said radio communication apparatuses.

9. A radio communication method as claimed in claim 7 further comprising the seep of effectuating only a synchronizing signal received from said called station within a predetermined time window located a predetermined time later than the timing of said synchronizing signal generated by said calling station, and wherein the compressed voice signal from said called station is expanded in time axis based on said effective synchronizing signal for reproducing an original voice signal.

10. A radio communication method as claimed in claim 9, wherein when said interrupt request signal from said interrupting station is received in the calling station, the compressed voice signal from said called station is expanded in time axis for reproducing the original voice signal, based on the timing of the center of said predetermined time window.

* * * * *